Sept. 15, 1931.  N. CHRISTIE  1,823,190
POWER PLANT
Filed Sept. 12, 1930  2 Sheets-Sheet 1

INVENTOR.
N. Christie
BY. E.J.Featherstonhaugh
ATTORNEY.

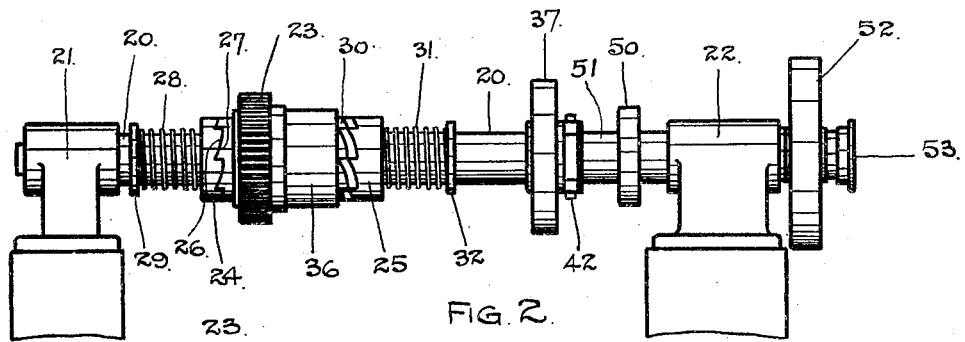
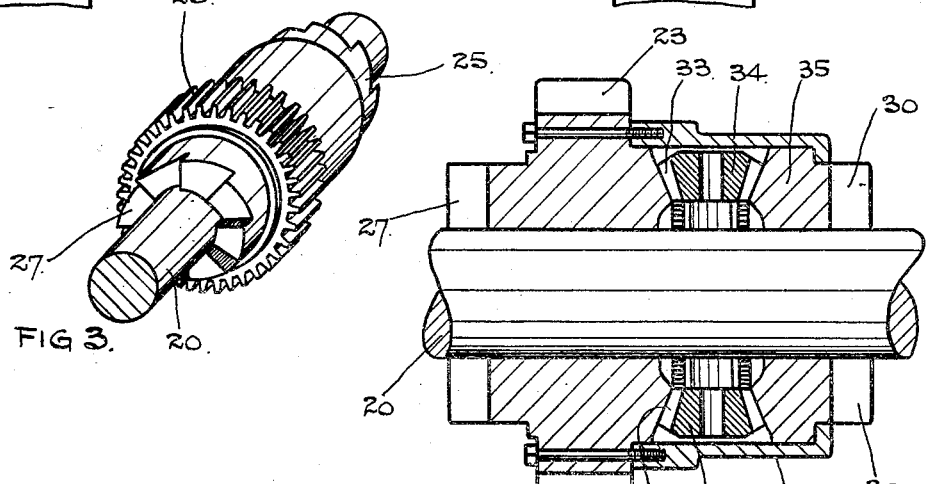
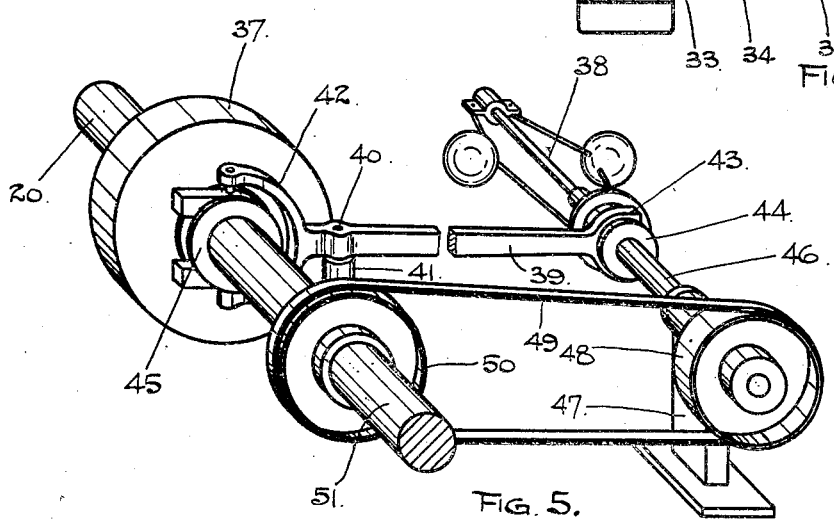

Patented Sept. 15, 1931

1,823,190

UNITED STATES PATENT OFFICE

NEIL CHRISTIE, OF LARDER LAKE, ONTARIO, CANADA

POWER PLANT

Application filed September 12, 1930. Serial No. 481,456.

This invention relates to a power plant, as described in the present specification and illustrated in the accompanying drawings which form part of same.

The invention consists essentially of the novel features pointed out broadly and specifically in the claim for novelty following a description containing an explanation in detail of an acceptable form of the invention.

The objects of this invention are to furnish a means for utilizing the energy of the ocean waves and transform it into useful work; to construct a device capable of supplying a given amount of power indefinitely notwithstanding the conditions of the tides or elements; to facilitate the production of power without recourse to steam or electricity other than harassing the energy of the vast natural resources of the ocean; to produce cheap power capable of being transformed into electrical energy for transmission and sale to the general public at a cost far lower than it would be possible under existing conditions and generally to provide a simple economical and efficient means for producing power in unlimited quantities at a negligible cost as to upkeep.

Referring to the drawings, Figure 1 is a perspective view of a complete installation according to this invention.

Figure 2 is an elevational view of the operating shaft and the contiguous parts thereof.

Figure 3 is a perspective view of the driving gear and a portion of the operation shaft.

Figure 4 is a sectional elevational view taken through the driving gear and ratchet clutches.

Figure 5 is a perspective view of the governor gear and clutch.

Like numerals of reference indicate corresponding parts in the various figures.

Figure 1:
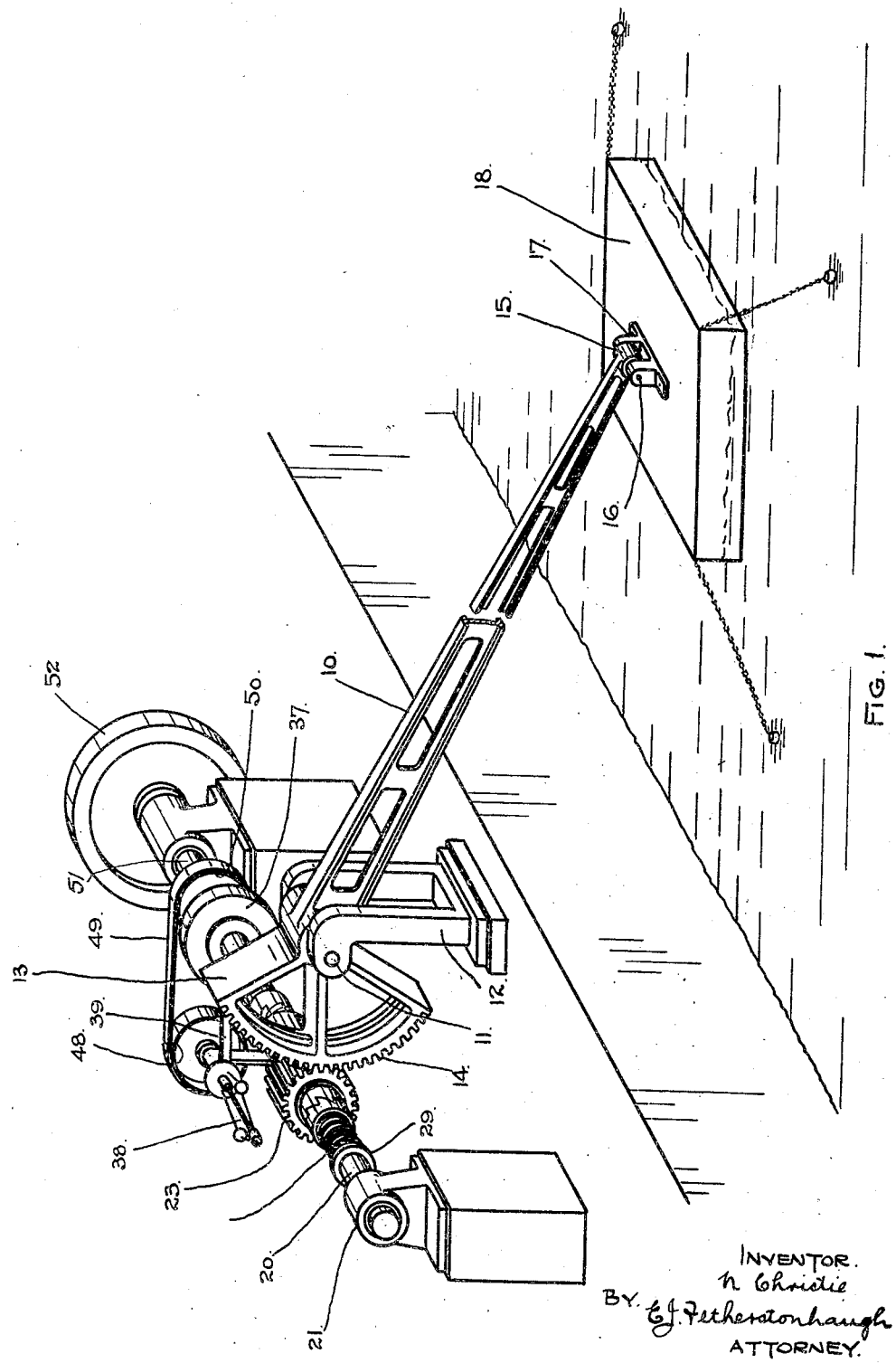

Referring to the drawings the numeral 10 indicates an arm pivoted at 11 in a suitable bracket 12 and extending into a quadrant 13 on the face of which are the gear teeth 14. The opposite end of the arm 10 forms a journal bearing 15 for the pin 16 which is secured in the bracket 17 forming part of the shallow hollow float 18. This float is lightly constructed of metal or other suitable material and may be anchored by the chains 19 to constrict its movement.

It can therefore be seen that the undulations of the float 18 are transmitted to the pivoted arm 10 which naturally causes the quadrant 13 to oscillate back and forth in unison with the float.

The operating shaft 20 is journalled in the bearings 21 and carries the freely mounted driving gear 23 which coacts with the quadrant 13 to rotate said driving shaft through the medium of the ratchet clutches 24 and 25.

The ratchet clutch 24 is provided with the ratchet teeth 26 and is slideably mounted on the shaft 20 and kept into engagement with the ratchet teeth 27 of the driving gear 23 by the coil spring 28 which abuts the collar 29.

The clutch 25 is also slideably mounted on the shaft 20 and is kept into engagement with the ratchet teeth 30 of the driving gear 23 by the spring 31 abutting against the collar 32.

It will be seen that to impart to the driving shaft an impulse for both the upward and downward movement of the arm 10 a means must be provided to reverse the direction of rotation of one of the ratchet clutches. To do this the driving gear 23 has on one of its faces the gear teeth 33 which coact with the idler gears 34 to drive the gear 35 on the face of which are formed the ratchet teeth 30, the whole being enclosed by the casing 36.

It will therefore be seen that while the ratchet teeth 27 always rotate in the same direction as the driving gear, the ratchet teeth 30 are always rotating in the opposite direction to that of the driving gear because of the idler gears 34. In this way it will be seen when the arm 10 moves upwardly the quadrant 13 will move downwardly and thereby rotate the driving gear 23 and engage the ratchet teeth of the clutch 24 and thereby rotate the shaft, meanwhile, the ratchets of the clutch 25 have been forced out of engagement owing to the fact that the driving gear ratchets 30 are rotating in the opposite direction and are sliding on the body of clutch along the driving shaft against the spring. On the downward movement of the arm 10 the quadrant 13 moves upwardly and reverses the direction of rotation of the driving gear 23, this disengages the dog clutch 24 and engages the dog clutch 25, the ratchet teeth of which are now rotating in the same direction as the driving shaft and a second impulse is imparted to the driving shaft 20.

This cycle is continued through every movement of the arm 10 so that the driving shaft 20 receives a continuous rotary movement in one direction.

The driving shaft also carries a friction clutch 37 the operation of which is controlled by the centrifugal governor 38 through the operating lever 39 which is pivoted at 40 on a suitable bracket 41 and is provided with the forked ends 42 and 43 pivotally mounted in the collars 44 and 45.

The governor shaft 46 is extended through the bearing 47 and carries a driving pulley 48 on the end thereof which is connected by the belt 49 to the pulley 50 fixedly secured to the shaft 51 journalled in the bearing 22 and which forms part of the driving shaft 20 and rotates therewith only when the clutch 37 is engaged. A heavy flywheel 52 and coupling 53 are secured to the end of the shaft to attach the motor to an electric generator or other device to be driven.

In the operation of this invention the motor is installed preferably in a place where the ocean has a steady swell so that the float 18 may be given a continuous undulatory movement. This has the effect of oscillating the arm 10 about its pivot point and engaging the quadrant 13 with the pinion 23 which rotates the driving shaft 20 by the ratchet clutches 24 and 25 as hereinbefore explained and imparts a continuous rotatory motion in one direction only.

The governor 38 is provided to allow the driven member to be rotated at a constant speed, that is to say, that in the event of a storm or any other abnormal condition when the arm 10 would be violently oscillated the speed of the driving shaft would be naturally increased, this in turn would increase the speed of the centrifugal governor 38 and causes the collar 44 to slide up the shaft 46 and operate the lever 39 which withdraws the clutch plate and frees the shaft 51 from the driving shaft 20. The flywheel 52 absorbing the momentum of the shaft 51 will allow the shaft to rotate until the speed of the flywheel and shaft are such as to allow the governor to slow down and engage the clutch again.

It will therefore be seen that the governor will allow the clutch to be very delicately adjusted so that the clutch will slip and allow the driven member to rotate at a fairly constant speed.

To allow for the difference in the heights of the tides the quadrant 13 is consequently considerably larger than is necessary so that the arm 10 may be tilted to a considerable angle and yet still allow the quadrant to engage the driving gear.

The advantages of this invention are manifold as although the mechanism is very simply constructed the amount of power derived from it would be very great and the upkeep practically nothing when once the motor was installed.

What I claim is:—

In a power plant, a pivoted oscillating arm adapted to be attached to a float member, a quadrant gear extending from the pivoted end of said arm and oscillating therewith and coacting with a driving gear loosely mounted on a driving shaft and provided with ratchet teeth on either face, a means for reversing the direction of rotation of one set of said ratchet teeth in relation to the other, ratchet clutches mounted on either side of said driving gear adapted to engage said driving gear ratchets alternately and thereby rotate said driving shaft in a constant direction, a friction clutch mounted on said driving shaft forming a freeable connection between said driving shaft and the driven member, a centrifugal governor mounted on a suitable bracket and operatively connected to said friction clutch by a pivoted arm, a pulley on said governor shaft connected by a belt to a pulley fixedly secured to a shaft extending from said clutch and rotate said governor and cause said clutch to free at a predetermined speed and thereby separate said driving shaft from the driven member.

Signed at Kirkland Lake, Canada, this 19th day of June, 1930.

NEIL CHRISTIE.